(12) United States Patent
Mathew et al.

(10) Patent No.: US 7,526,680 B2
(45) Date of Patent: Apr. 28, 2009

(54) STRESS TESTING A WEBSITE HAVING A BACKEND APPLICATION

(75) Inventors: Ciby Mathew, Toronto (CA); Nuzio Ruffolo, Markham (CA)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/153,280

(22) Filed: Jun. 15, 2005

(65) Prior Publication Data

US 2006/0288256 A1 Dec. 21, 2006

(51) Int. Cl.
*G06F 11/00* (2006.01)

(52) U.S. Cl. .............................. 714/37; 714/32; 714/46; 714/49

(58) Field of Classification Search .................. 714/32, 714/33, 37, 38, 46, 49
See application file for complete search history.

(56) References Cited

U.S. PATENT DOCUMENTS

| | | | | |
|---|---|---|---|---|
| 5,642,504 A * | 6/1997 | Shiga | ........................... | 707/10 |
| 6,249,886 B1 * | 6/2001 | Kalkunte | ..................... | 714/47 |
| 6,560,564 B2 * | 5/2003 | Scarlat et al. | ................ | 702/186 |
| 6,694,288 B2 * | 2/2004 | Smocha et al. | ............... | 702/186 |
| 6,754,701 B1 * | 6/2004 | Kessner | ....................... | 709/219 |
| 6,889,160 B2 * | 5/2005 | Sabiers et al. | ............... | 702/122 |
| 7,133,805 B1 * | 11/2006 | Dankenbring et al. | ........ | 702/186 |
| 7,222,269 B2 * | 5/2007 | Kurinami et al. | .............. | 714/47 |
| 7,240,243 B2 * | 7/2007 | Decker | ......................... | 714/33 |
| 2003/0188224 A1 * | 10/2003 | Decker | ......................... | 714/25 |
| 2006/0143531 A1 * | 6/2006 | Kilian et al. | ................... | 714/38 |
| 2006/0195725 A1 * | 8/2006 | Shah et al. | ..................... | 714/38 |

* cited by examiner

*Primary Examiner*—Joshua A Lohn
(74) *Attorney, Agent, or Firm*—Patents on Demand, PA

(57) ABSTRACT

Execution of a test scenario is managed where the test scenario is for testing a website deployment having a server in communication with a backend application. A testing interface is established at a client in communication with the server to concurrently incite requests from the client to the server. The test scenario includes at least one test case and each test case includes at least one request. Requests for the backend application received from the client are then processed. The processed requests are provided to the backend application for fulfillment thereof. A failure of the fulfillment of the requests is identified. An outline of status information on fulfillment of the requests is provided to the testing interface. The outline of status information may include information on the failure.

24 Claims, 3 Drawing Sheets

STRESS TESTING A WEBSITE HAVING A BACKEND APPLICATION

FIELD OF THE INVENTION

The present invention relates to the field of website stress testing and in particular stress testing of a website having a backend application.

BACKGROUND OF THE INVENTION

When the complete solution provided by a website is subjected to stress testing there is intent to test both the functioning of the individual components involved in providing the solution as well as the interconnection between these components. For a website that has a backend application, which may or may not be located on a server hosting the website, such testing of the interconnections involves testing a client or user connection to the server and the connection between the server and the backend application.

The website may be stress tested by sending requests to the server that involve accessing the backend application to simulate real-life use of the website. Such stress testing may be implemented by driving requests from the client to the server where the server processes the requests and involves the backend application as appropriate. However, if volume is part of the stress testing then there may be a large number of requests, and subsequently an even larger volume of diagnostic information, traversing the connection between the client and the server which may not align with the testing objectives when the focus of the testing is the connection between the server and the backend application.

SUMMARY OF THE INVENTION

In accordance with one aspect of the present invention there is provided a method of managing a test scenario for a website deployment having a server in communication with a backend application, the method comprising: establishing a testing interface at a client in communication with the server to concurrently incite requests from the client to the server, wherein the test scenario includes at least one test case and each test case includes at least one request; processing requests for the backend application received from the client; providing the processed requests to the backend application for fulfillment thereof; and providing an outline of status information on fulfillment of the requests to the testing interface, the outline including information on a failure of the fulfillment of the requests.

In accordance with another aspect of the present invention there is provided a system for managing a test scenario for a website deployment having a server in communication with a backend application, the system comprising: a testing interface to be established at a client in communication with the server to concurrently incite requests from the client to the server, wherein the test scenario includes at least one test case and each test case includes at least one request; an interpretation mechanism for processing requests for the backend application received from the client; an execution mechanism for providing the processed requests to the backend application for fulfillment thereof; a feedback mechanism for identifying a failure of the fulfillment of the requests; and a display mechanism for providing an outline of status information on fulfillment of the requests to the testing interface, the outline including information on the failure.

In accordance with a further aspect of the present invention there is provided a computer readable medium having stored thereon computer-executable instructions for managing a test scenario for a website deployment having a server in communication with a backend application, the computer-executable instructions comprising: establishing a testing interface at a client in communication with the server to concurrently incite requests from the client to the server, wherein the test scenario includes at least one test case and each test case includes at least one request; processing requests for the backend application received from the client; providing the processed requests to the backend application for fulfillment thereof; and providing an outline of status information on fulfillment of the requests to the testing interface, the outline including information on a failure of the fulfillment of the requests.

Execution of a test scenario is managed where the test scenario is for testing a website deployment having a server in communication with a backend application. A testing interface is established at a client in communication with the server to concurrently incite requests from the client to the server. The test scenario includes at least one test case and each test case includes at least one request. Requests for the backend application received from the client are then processed. The processed requests are provided to the backend application for fulfillment thereof. A failure of the fulfillment of the requests is identified. An outline of status information on fulfillment of the requests is provided to the testing interface. The outline of status information may include information on the failure.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS

Figure 1:
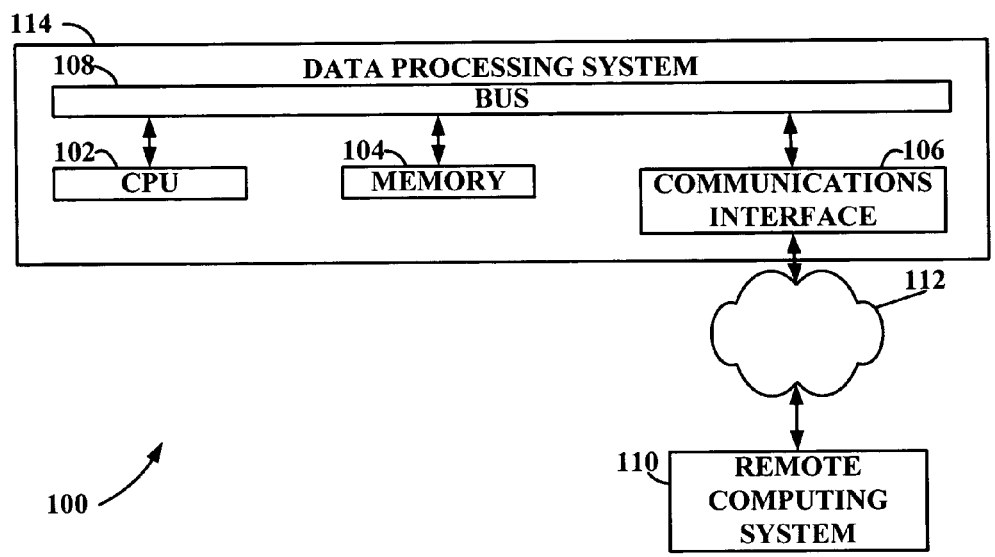
FIG. 1 is a general exemplary computing environment in which the present invention may be implemented.

FIG. 1 illustrates a configuration of a computing environment 100 in which the present invention may be implemented.

A data processing system 114 in the computing environment 100 includes a central processing unit (CPU) 102, a memory 104, a communications interface 106 and a bus 108. The CPU 102, the memory 104 and the communications interface 106 are connected with one another via the bus 108. The communications interface 106 is configured so that it can be connected to a network 112 or an input/output unit (not shown).

The data processing system 114 may access the network 112 and any other devices connected to the network 112, such as a remote computing system 110, via the communication interface 106.

The present invention may be embodied in a program stored in, for example, the memory 104. Alternatively, the present invention may be recorded on any type of recording medium such as a magnetic disk or an optical disk. The present invention recorded on such a recording medium is loaded to the memory 104 of the computing environment 100 via the communications interface 106.

The CPU 102 can be a commercially available CPU or a customized CPU suitable for operations described herein. Other variations of the CPU 102 can include a plurality of CPUs interconnected to coordinate various operations and functions. The computing environment 100 serves as an apparatus for performing the present invention by the CPU 102 executing the present method.

Figure 2:
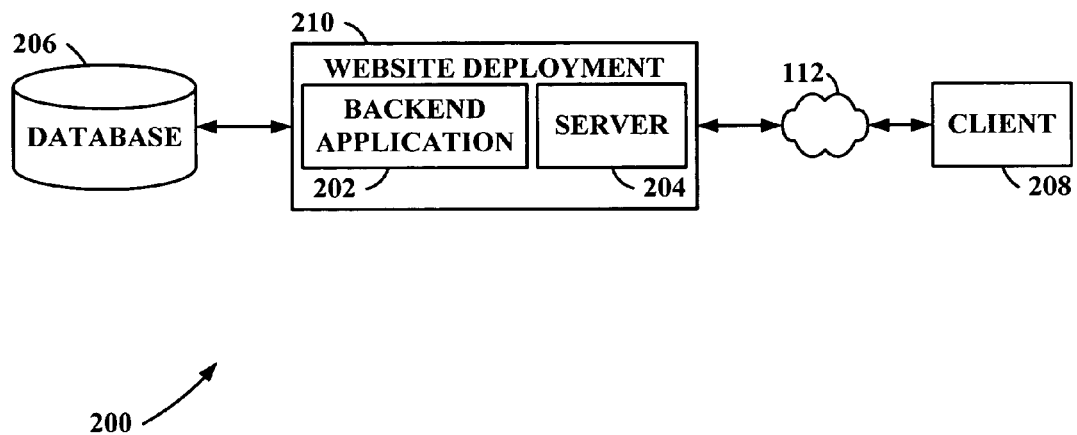
FIG. 2 is an exemplary computing environment of the present invention illustrating a website deployment.

FIG. 2 is an overview of a computing environment 200 in which website deployment stress testing is being performed.

A website deployment 210 provides components of a website that implement a website solution. The website deployment 210 includes a server 204 and a backend application 202. The server 204 hosts the front end of the website and manages receipt of requests and transmission of results from the requests. The backend application 202 may provide the core functionality of the website. The backend application 202 may be in communication with a database 206, which provides content that is being requested, for management of the contents therein. For example, in the case of an electronic bookstore, the server 204 may host the webpages that are seen by a user as well as receive requests from a user to search for a particular book. These requests are given to the backend application 202 that searches through the database 206 for the book. Results of the search are given back to the server 204 and presented to the user.

The website deployment 210 may be accessed by the user through a client 208 via the network 112. The client 208 may be a web browser of the user accessing the website and submitting requests to the server 204 for information on items identified on the website.

The client 208 may be similar to the remote computing system 110 of FIG. 1 while the website deployment 210 and database 206 may be similar to the data processing system 114.

The integration of the server 204 with the backend application 202 and the database 206 is stressed to test the scalability and responsiveness of the backend application 202 and the database 206 to the server 204 by inciting a concurrent workload from the client 208. The testing simulates the stress that the integration of the backend application 202 with the server 204 would experience during varying loads imposed by real-life use. A workload is generated by simulating an arbitrary number of clients requesting service. A testing interface is loaded at the client 208 so that all of these requests can originate from a single source. The testing interface presents controls to manage a workload of the test and a set of indicators that provide feedback on the requests.

Figure 3:
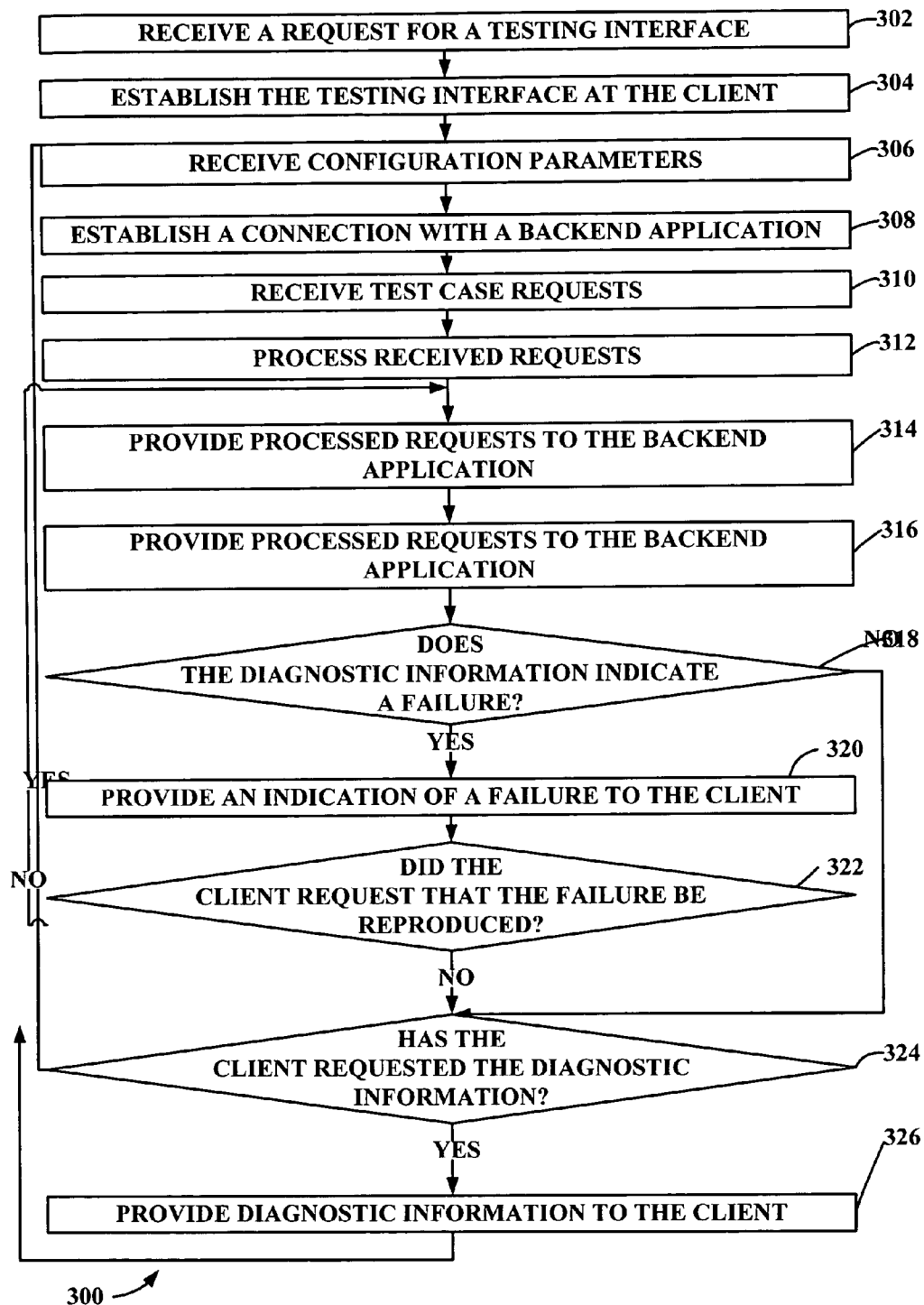
FIG. 3 is a flow diagram illustrating a method of stress testing a website deployment.

FIG. 3 illustrates a method 300 of stress testing the website deployment 210 from the server 204. Test cases and execution control of these test cases are maintained by the server 204 while a test schema containing sample information that is to be used by the test cases for testing is managed by the backend application 202 and the database 206. The test schema is an exemplary schema in the database 206 that contains the data that will be accessed by the requests of the test case during execution. The workload may be changed by varying the number and type of database objects contained in the test schema, as well as the nature of each test case to test for contention for operating system resources when the server 204 and the backend application 202 are situated in the same device. The client 208 is only an interface for the testing; the functionality of the method 300 is provided by the server 204. If the backend application 202 is in communication with database(s) 206 then all of these database(s) 206 may be tested by the method 300. Since the testing functionality is located primarily in the server 204, the data flow between the client 208 and server 204 may be reduced.

The workload is composed of one or more test cases, each of which simulates the actions of a single user and is composed of one or more requests that access the server 204 and the associated backend application 202. The requests may be for a query, update, etc., of the test schema in the database 206 that is managed by the backend application 202. The complexity of each test case is governed by number and type of requests that compose the test case. The testing interface cites the composite requests of the test case either sequentially, concurrently or a combination thereof. One or more test cases form a test scenario that is the overall stress test being performed. The workload is the stress placed on the website deployment by the test scenario. The test scenario provides the overall flow of the test by setting out the order in which each test case is executed (i.e. sequentially, concurrently or a combination thereof). Thus, a test case may be used in multiple different test scenarios along with other different test cases which in turn may provide different results. The results may depend on the order in which individual test cases are executed if each test case results in an alteration of the test schema which is accessed and modified by subsequently executed test cases.

A request is received from the client 208 for a testing interface in step 302. This request may be for a webpage held by the server 204 and may take the form of, for example, an http (hyper text transfer protocol) request. The testing interface is established at the client 208 in step 304, for example, by passing an html (hyper text markup language) webpage to the client 208. The client 208 may display the interface via a display interface such as a web browser. The testing interface may provide the user with control options for managing execution of tests cases, configuration parameters for managing a workload of the test and a set of indicators that provide feedback on the results of the tests.

Each testing interface at the client 208 may control multiple test cases, all of which are to be performed on a single server 204. Since each test case simulates the actions of a single user, the number of test cases that are simultaneously performed increases the stress on the integration between the server 204 and the backend application 202. All of the test cases that are testing a particular server 204 and backend application 202 collectively form the workload that the server 204 is experiencing. The number of test cases being executed, and therefore the number of requests being processed, as well as the complexity of the requests all determine the workload. Varying the volume of simultaneous test cases will test the integration and scalability of the backend application 202 with respect to the server 204.

The testing interface may include an element (e.g. an HTML element such as iframe) for each test case that is to be executed. Each of these elements may load an address to a control application on the server 204 that determines an execution sequence for each of the test cases. The testing interface may simply present each element as a link to the actual element at the server 204 which can be accessed by the client 208 on request.

The testing interface provided to the client 208 enables the client 208 to obtain configuration parameters for the workload from the user. These configuration parameters are used to set the characteristics of the workload and may include, the number of test cases that are to be executed, the delay between requests (simulating high or low load conditions) and the type of requests that the test cases are to represent.

The configuration parameters are received by the server 204 from the client 208 in step 306. The configuration parameters collected by the testing interface are used by the client 208 and the server 204 for test case configuration. While some parameters influence configuration by the client 208 (e.g. a delay between submitting requests) other parameters are used by the server 204 for configuration (e.g. a filter that restricts the types of operations allowed in the test scenario). The testing interface configures each test case and the requests of each test case according to the configuration parameters. Those configuration parameters that apply to the client 208 managed configuration are applied to the workload to configure test cases and requests. The element in the testing interface may perform this configuration. The element creates the requests that form the test case based on the configuration parameters. Each request may be in the form of a number which can be interpreted by the server 204 and translated into a command. This simplified command can be sent from the server 204 to the backend application 202 for fulfillment.

A connection with the backend application 202 is established in step 308. The backend application 202 may be located in the same computing system as the server 204, may be close physical proximity to the server 204 or may be remotely located from the server 204.

Requests are sent from the client 208 and received by the server 204 in step 310. Transmission of the requests from the client 208 to the server 204 may be managed by the element in the testing interface.

The received requests are processed in step 312. Such processing may include applying the configuration parameters to the received requests. The application of the configuration parameters at this time may involve filtering the received requests to permit only those that adhere to characteristics of the current test scenario (e.g. being for a specific type of action). Processing of the requests may also involve converting the requests from a format in which they were received to a format that can be interpreted by the backend application 202. The requests may be in the form of a number when received. This number may correspond with, for example, a specific SQL query that can be executed by the backend application 202. It may be the SQL query that is provided to the backend application 202.

After the connection with the backend application 202 has been established and the requests have been processed, the requests can be fulfilled. In step 314 the requests are provided to the backend application 202 for execution. The backend application 202 fulfills the provided requests either by obtaining the requested information from the database 206 or by executing the request and providing the results to the server 204.

Diagnostic and metrics information is produced by the backend application 202 and the server 204 during execution of the workload. Such information may include statistics related to the performance of the backend application 202 and server 204 during execution of workload (e.g. average wait time for a response to a common request) as well as any faults or failures that were produced. This information is provided to the server 204 from the backend application 202 where it is stored for assessment. The diagnostic information is received by the server 204 in step 316.

Upon receipt of the diagnostic information at the server 204 a determination is made in step 318 as to whether this information indicates a failure. If the diagnostic information includes an indication of a failure then such an indication is provided to the client 208 in step 320. When providing an indication of the failure to the client 208 an outline of status information may also be provided. This outline of status information may be a brief summary of the diagnostic information and may include an indication of the failure. The failure indication may be provided to the client 208 using the element in the testing interface representing the test case that experienced the failure. A network failure or timeout may not be considered because they can be fixed and the test cases executed. Errors that imply failure in the interface between the server 204 and the backend application 202 as well as failures between the database 206 and the backend application 202 are considered. Some execution characteristics may be monitored by the client 208 to detect conditions such as an unexpected suspension of the server 204 process which can be detected by the client 208 by limiting execution time.

After the indication of the failure is provided to the client 208 then a determination is made in step 320 if the client 208 requested that the failure be reproduced. If the failure is to be reproduced then the workload is re-executed using the same configuration parameters and test schema that were present when the failure occurred. Steps 314 and 316 are repeated as the workload is re-executed.

If the client 208 did not request that the failure be reproduced (step 322) or if the diagnostic information did not indicate a failure (step 318) then a determination is made in step 324 if the client 208 requested the diagnostic information. The diagnostic and metrics information produced by the backend application 202 and the server 204 may be provided to the client only upon request from the client (i.e. on demand). This diagnostic and metrics information is a more detailed version of the outline of status information and may include information not present in the outline. If the diagnostic information was requested then this information is provided to the client 208 in step 326 where it may be displayed. The diagnostic information may be provided to the client 208 using the element in the testing interface representing the test case for which diagnostic information was required. If the diagnostic information was not requested or after the diagnostic information has been provided then the method 300 returns to step 306 where new configuration parameters may be provided and a subsequent workload may be executed.

Figure 4:
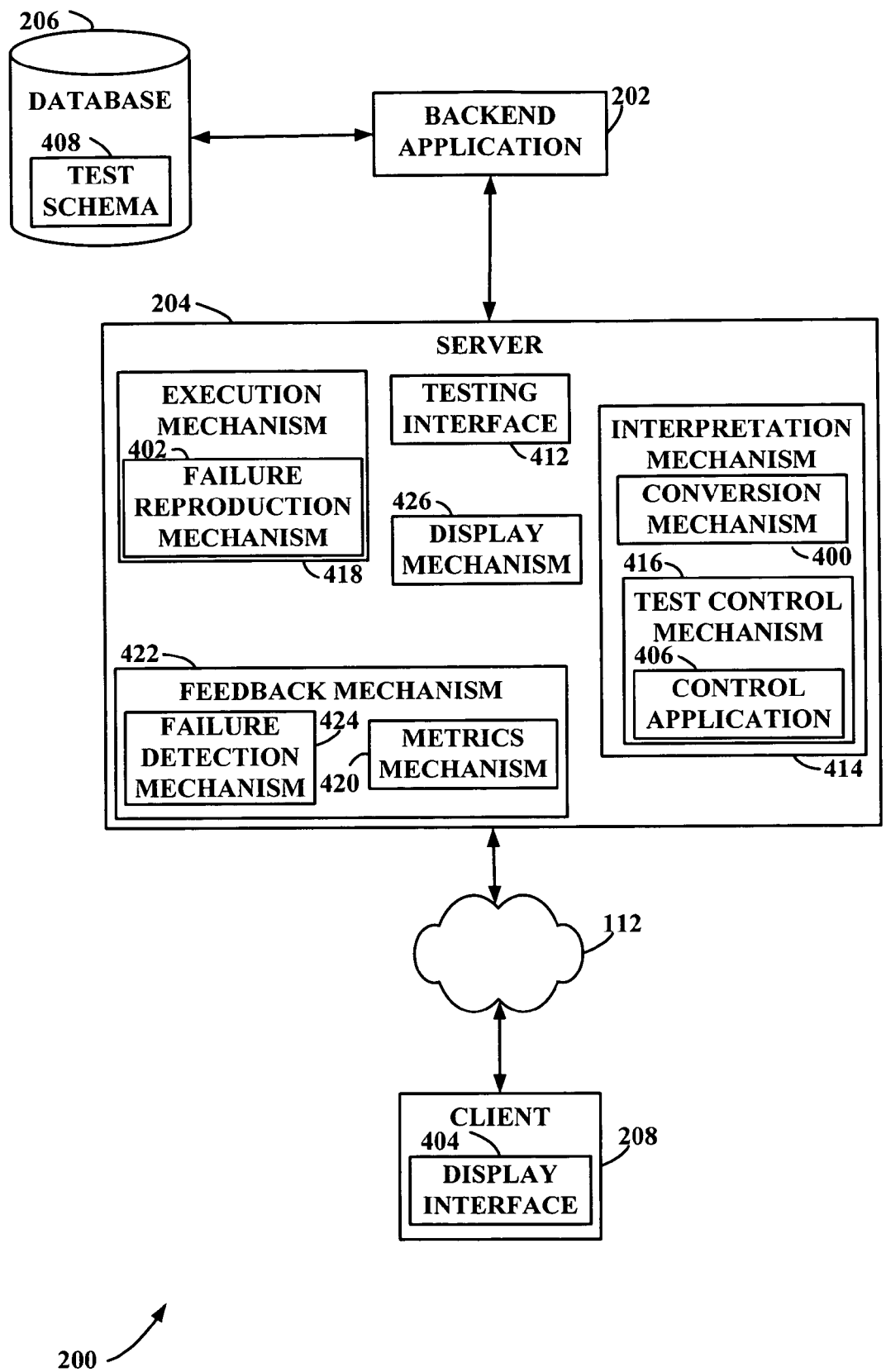
FIG. 4 illustrates a system for stress testing a website deployment.

FIG. 4 illustrates a system 400 for stress testing the website deployment 210 according to the first embodiment.

The server 204, the backend application 202 and the database 206 collectively form the website deployment that is accessed by the client 208 over the network 112. The client 208 is in communication with the server 204 via the network 112 to access testing functionality provided by the server 204 for testing the backend application 202. Although only one database 206 and one backend application 202 are shown, the server 204 may be in communication with multiple backend applications 202. Likewise, the backend application 202 may be in communication with multiple databases 206. All of the backend applications 202 and databases 206 may be tested through the one server 204 and the one client 208. There may also be multiple servers 204 in communication with the client 208, all of which may be tested through this single point.

The client 208 includes a display interface 404 that presents the testing functionality of the server 204 to a user of the client 208 and may take the form of, for example, a web browser. The control functionality that is presented by the display interface 404 may include functions for controlling characteristics and execution of a workload on the backend application 202, and displaying failure events or other diagnostic information for an executing workload, including metrics. The control functionality presented through the display interface 404 is provided by the server 204.

The server 204 comprises a testing interface 412, an interpretation mechanism 414, an execution mechanism 418, a feedback mechanism 422, and a display mechanism 426. The testing interface 412 is the front end interface of the website deployment 210 and may take the form of a webpage. When a request is received from the client 208 for the website, it is the testing interface 412 that is provided to the client 208 for display on the display interface 404. While the display interface 404 provides the framework within which functionality can be provided, it is the testing interface 412 that provides such functionality. The testing interface 412 provides operable communication between the client 208 and the other mechanisms of the server 204.

The database 206 includes a test schema 408 that provides a schema of data that is the subject of the requests in the test cases.

The interpretation mechanism 414 includes a test control mechanism 416 and a conversion mechanism 400. The test control mechanism 416, in conjunction with the testing interface 412, solicits configuration parameters for the workload from the client 208. The test control mechanism 416 may set out the types of configuration parameters that are to be supplied before the workload can be executed. The application of the parameters to the workload configures the workload to perform a particular type of stress testing. As the server 204 receives requests from the client 208, the configuration parameters may be applied by the testing control mechanism 416 to filter the requests to remove any requests that do not conform to the test scenario.

The test control mechanism 416 includes a control application 406 for controlling execution of a test case. The test control mechanism 416 may include a separate control application for each test case. The control application 406 determines and manages an execution sequence for each test case as well as each request in a test case.

The testing interface 412 may include an element (e.g. an HTML element) for each test case that links to the control application 406 which controls execution of the test case. The element may create the requests that form the test case as well as manage presentation of diagnostic information. The element in the display interface 404 created by the testing interface 412 retains configuration parameters relating to client side configuration while all others are provided to the test control mechanism 416. The control application 406 may also keep track of metrics and diagnostic information for the test case.

The conversion mechanism 400 receives the requests from the test control mechanism 416 and translates them from the form in which they were received to a form that can be interpreted by the backend application 202. Such translation may involve converting the requests from a number representing a request in a table into that request, which may be in the form of, for example, an SQL request.

The execution mechanism 418 manages execution of the test cases and includes a failure reproduction mechanism 402. A connection with the backend application 202 is established by the execution mechanism 418. The execution mechanism 418 activates the metrics mechanism 420 and the feedback mechanism 422 to monitor the progress of the test cases that are being executed by the backend application 202.

The failure reproduction mechanism 402 repeats execution of a test scenario or a test case in the case of a failure. The failure reproduction mechanism 402 waits for instructions from the client 208 before proceeding with attempting to reproduce the failure.

The feedback mechanism 422 filters all of the feedback received from the executing test cases. The feedback mechanism 422 includes a failure detection mechanism 424 that first assesses all of the feedback searching to detect a failure and a metrics mechanism 420. If a failure is detected then a failure indication is produced and provided to the display mechanism 426 to be provided to the client 208. After the feedback has been analyzed for failures, the appropriate information is then provided to the metrics mechanism 420 to form metrics about the performance of the test cases. Any feedback other than failures and metrics information is stored by the feedback mechanism 422. The feedback mechanism 420 forms an outline of status information that includes an indication of any failure and may also provide a brief summary of diagnostic information. If the client 208 requests feedback regarding errors or warnings that are not critical enough to cause a failure, the feedback mechanism 422 provides the saved feedback to the display mechanism 426 for provision to the client 208. The feedback mechanism 422 may provide information on non-critical errors or warnings only on request from the client 208 (i.e. on demand).

The metrics mechanism 420 takes in metrics about the performance of the backend application 202 and the database 206 during execution of the test cases. The metrics mechanism 420 stores these metrics until they are requested by the client 208. Upon receipt of such a request, the metrics mechanism 420 provides the requested metrics to the display mechanism 426. The metrics mechanism 420 may provide metrics information only on request from the client (i.e. on demand).

The feedback mechanism 422 and the metrics mechanism 420 may cooperate to form detailed status information on fulfillment of the requests. This detailed status information may include the diagnostic information (e.g. non-critical errors or warning) and the metrics information.

The display mechanism 426 receives information that is to be provided to the client 208 and formats this information for display. This information may be formatted with the element for a test case if information on a specific test case has been requested. The formatted information is provided to the client 208 for display through the test interface 404.

The following detailed description of the embodiments does not limit the implementation of the embodiments to any particular computer programming language. The computer program product may be implemented in any computer programming language provided that the operating system provides the facilities that support the requirements of the computer program product. Any limitations presented would be a result of a particular type of operating system, computer programming language, or data processing system and would not be a limitation of the embodiments described herein.

Embodiments of the present invention may be implemented in any conventional computer programming language. For example, embodiments may be implemented in a procedural programming language (e.g. "C") or an object oriented language (e.g. "C++", "Java"), or a fourth generation language (e.g. "Perl", "python"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a disk storage, magnetic tape, diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, radio frequency, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, radio frequency, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet, extranet, intranet, or World Wide Web). Some embodiments of the invention may be implemented as a combination of both software (e.g. a computer program product) and hardware. Still other embodiments of the invention may be implemented as entirely hardware, or entirely software (e.g. a computer program product).

It is apparent to one skilled in the art that numerous modifications and departures from the specific embodiments described herein may be made without departing from the spirit and scope of the invention.

We claim:

1. A method of managing a test scenario for a website deployment having a server in communication with a backend application, the method comprising:
   receiving a request at the server from a client for a testing interface, the testing interface for executing the test scenario, wherein the test scenario includes at least one test case and each test case includes at least one request;
   establishing the testing interface at the client to concurrently incite requests from the client to the server, wherein the testing interface is transmitted from the server to the client;
   processing requests at the server for the backend application received from the client;
   providing the processed requests from the server to the backend application for fulfillment thereof;
   producing status information related to performance of the backend application on fulfillment of the requests at the server; and
   providing an outline of the status information to the testing interface, the outline including information on a failure of the fulfillment of the requests.

2. The method according to claim 1 further including:
   providing, from the server, detailed status information on fulfillment of the requests responsive to a request therefor from the client received at the server, the detailed status information including at least one of diagnostic information and metrics information.

3. The method according to claim 1 further including:
   repeating the steps of processing requests, and providing the processed requests when the failure is identified responsive to a request from the client.

4. The method according to claim 1 wherein the step of establishing futher comprises:
   receiving configuration parameters for the test scenario from the testing interface.

5. The method according to claim 4 wherein the step of establishing further comprises:
   establishing a control application for each test case in the test scenario according to the configuration parameters, the control application managing generation and transmission of the requests from testing interface.

6. The method according to claim 1 wherein the step of processing requests comprises:
   receiving the requests from the testing interface; and
   applying configuration parameters received from the testing interface to the received requests.

7. The method according to claim 6 wherein the step of applying comprises:
   filtering the received requests to retain only those requests that conform to the configuration parameters.

8. The method according to claim 6 wherein the step of processing requests further comprises:
   converting the requests from a received format to a second format, the second format being comprehendible by the backend application.

9. The method according to claim 1 wherein the step of providing to the server an outline of status information comprises:
   receiving results of the fulfillment of the requests from the backend application; and
   processing the results comprising:
      identifying status and metrics information in the results; and
      determining the failure.

10. A system for managing a test scenario for a website deployment having a server in communication with a backend application, the system comprising:
   a testing interface to be established at a client in communication with the server to concurrently incite requests from the client to the server, wherein the test scenario includes at least one test case and each test case includes at least one request;
   an interpretation mechanism at the server for processing requests for the backend application received from the client;
   an execution mechanism at the server for providing the processed requests to the backend application for fulfillment thereof;
   a feedback mechanism at the server for identifying a failure of the fulfillment of the requests and producing an outline of status information on fulfillment of the requests; and
   a display mechanism at the server for providing an outline of the status information to the testing interface, the outline including information on the failure.

11. The system according to claim 10 wherein the feedback mechanism comprises:
   a metrics mechanism for providing detailed status information on fulfillment of the requests responsive to a request therefor from the client, the detailed status information including at least one of the diagnostic information and metrics information.

12. The system according to claim 10 wherein the execution mechanism comprises:
   a failure reproduction mechanism for repeating the requests when the failure is identified responsive to a request from the client.

13. The system according to claim 10 wherein the interpretation mechanism comprises:
   a test control mechanism for applying confirmation parameters received from the testing interface to the received requests.

14. The system according to claim 10 wherein the interpretation mechanism comprises:

a conversion mechanism for converting the requests from a received format to a second format, the second format being comprehendible by the backend application.

15. The system according to claim 10 wherein the feedback mechanism comprises:
   a failure detection mechanism for determining the failure; and
   a metrics mechanism for identifying status and metrics information in the results.

16. A computer readable storage medium having stored thereon computer-executable instructions for managing a test scenario for a website deployment having a server in communication with a backend application, the computer-executable instructions configure the website deployment to:
   receive a request at the server from a client for a testing interface, the testing interface for executing the test scenario, wherein the test scenario includes at least one test case and each test case includes at least one request;
   establish the testing interface at the client in communication with the server to concurrently incite requests from the client to the server, wherein the testing interface is transmitted to the client from the server;
   process requests at the server for the backend application received from the client;
   provide the processed requests from the server to the backend application for fulfillment thereof;
   produce status information related to performance of the backend application on fulfillment of the requests at the server; and
   provide an outline of the status information to the testing interface, the outline including information on a failure of the fulfillment of the requests.

17. The computer readable storage medium of claim 16 further including instructions to configure the website deployment to:
   provide detailed status information on fulfillment of the requests responsive to a request therefor from the client, the detailed status information including at least one of diagnostic information and metrics information.

18. The computer readable storage medium of claim 16 further including instructions to configure the website deployment to:
   repeat the steps of processing requests, and providing the processed requests when the failure is identified responsive to a request from the client.

19. The computer readable storage medium of 16 wherein the computer executable instructions which configure the website deployment to establish the testing interface further configures the website deployment to:
   receive configuration parameters for the test scenario from the testing interface.

20. The computer readable storage medium of claim 19 wherein the computer executable instructions which configure the website deployment to establish the testing interface further configures the website deployment to:
   establish a control application for each test case in the test scenario according to the configuration parameters, the control application managing generation and transmission of the requests from testing interface.

21. The computer readable storage medium of claim 16 wherein the computer executable instructions which configure the website deployment to process requests further configures the website deployment to:
   receive the requests from the testing interface; and
   apply configuration parameters received from the testing interface to the received requests.

22. The computer readable storage medium of claim 21 wherein the computer executable instructions which configure the website deployment to apply configuration parameters further configures the website deployment to:
   filter the received requests to retain only those requests that conform to the configuration parameters.

23. The computer readable storage medium of 21 wherein the computer executable instructions which configure the website deployment to process requests further configures the website deployment to:
   convert the requests from a received format to a second format, the second format being comprehendible by the backend application.

24. The computer readable storage medium of claim 16 wherein the computer executable instructions which configure the website deployment to provide an outline of status information further configures the website deployment to:
   receive results of the fulfillment of the requests from the backend application; and
   process the results comprising:
   identifying status and metrics information in the results; and
   determine the failure.

* * * * *